(12) United States Patent
Eberle et al.

(10) Patent No.: US 10,575,513 B2
(45) Date of Patent: Mar. 3, 2020

(54) HOOF SHOE FOR A HOOFED ANIMAL

(71) Applicant: GUDO AG, Lupfig (CH)

(72) Inventors: Armin Eberle, Hörhausen (CH);
Enrico Maraffio, Mellingen (CH)

(73) Assignee: GUDO AG, Lupfig (CH)

( * ) Notice: Subject to any disclaimer, the term of this patent is extended or adjusted under 35 U.S.C. 154(b) by 213 days.

(21) Appl. No.: 15/515,251

(22) PCT Filed: Oct. 2, 2015

(86) PCT No.: PCT/EP2015/072861
§ 371 (c)(1),
(2) Date: Mar. 29, 2017

(87) PCT Pub. No.: WO2016/055387
PCT Pub. Date: Apr. 14, 2016

(65) Prior Publication Data
US 2017/0208791 A1   Jul. 27, 2017

(30) Foreign Application Priority Data

Oct. 10, 2014   (CH) .................................. 01554/14
Apr. 14, 2015   (CH) .................................. 00522/15

(51) Int. Cl.
*A01L 3/00*      (2006.01)
*A01K 13/00*    (2006.01)
*A01L 5/00*      (2006.01)

(52) U.S. Cl.
CPC .............. *A01L 3/00* (2013.01); *A01K 13/007* (2013.01); *A01L 5/00* (2013.01)

(58) Field of Classification Search
CPC .......... A01L 3/00–06; A01L 5/00; A01L 7/02; A01K 13/007
(Continued)

(56) References Cited

U.S. PATENT DOCUMENTS 1,174,848 A    3/1916  Gear
1,357,399 A   11/1920  Horn
(Continued)

FOREIGN PATENT DOCUMENTS

DE   102005051707 A1 *  5/2007  ........... A01K 13/007
EP       1210873 A2     6/2002
(Continued)

OTHER PUBLICATIONS

Abstract of EP 1210873.

*Primary Examiner* — Magdalena Topolski
*Assistant Examiner* — Morgan T Barlow
(74) *Attorney, Agent, or Firm* — Brian Roffe

(57) ABSTRACT

Hoof shoe for a hoofed animal, preferably a horse, is provided with a bottom part and with a wall that encloses the hoof at the front and sides. An opening with approximately the width of the hoof is provided at the back, and a closure flap is provided which can be opened and closed at this opening and, in the closed state, can be pressed approximately with a form fit onto the rear part of the hoof by a tightening structure. The hoof shoe thus includes a shoe body which can be easily produced in one or two parts and of which the open rear face makes it substantially easier to fit and remove the hoof shoe, and of which the closure flap, in the closed state, ensures a secure fixing of the hoof shoe.

17 Claims, 5 Drawing Sheets

(58) Field of Classification Search
USPC .................. 54/82; 168/22, 18, 17, 12–14
See application file for complete search history.

(56) References Cited

U.S. PATENT DOCUMENTS

| | | | |
|---|---|---|---|
| 4,744,422 A | 5/1988 | Dallmer | |
| 5,661,958 A * | 9/1997 | Glass | A01L 3/00 168/18 |
| 5,692,569 A * | 12/1997 | Constantino | A01L 3/00 168/17 |
| 5,715,661 A * | 2/1998 | Meyers | A01K 13/007 168/18 |
| 6,062,008 A | 5/2000 | Nor | |
| 6,122,901 A * | 9/2000 | Schultz | A61D 9/00 168/27 |
| 6,192,989 B1 * | 2/2001 | Tooman | A01K 13/007 168/1 |
| 6,305,328 B1 * | 10/2001 | Marquis | A01K 13/007 119/850 |
| 6,560,951 B1 | 5/2003 | Wood | |
| 6,694,713 B1 | 2/2004 | MacDonald | |
| 7,032,367 B1 * | 4/2006 | Yoho | A01K 13/007 54/82 |
| 7,178,321 B2 | 2/2007 | Ruetenik | |
| 8,186,447 B2 | 5/2012 | Osborne | |
| 2004/0168813 A1 * | 9/2004 | Ford | A01K 13/007 168/12 |
| 2005/0066632 A1 * | 3/2005 | Ford | A01K 13/007 54/82 |
| 2005/0150197 A1 * | 7/2005 | Ford | A01K 13/007 54/82 |
| 2005/0166556 A1 * | 8/2005 | Ford | A01K 13/007 54/82 |
| 2006/0064950 A1 * | 3/2006 | Ford | A01K 13/007 54/82 |
| 2008/0083198 A1 * | 4/2008 | Wilson | A01K 13/007 54/82 |
| 2008/0083542 A1 * | 4/2008 | Ford | A01K 13/007 168/18 |
| 2008/0264005 A1 * | 10/2008 | Ford | A01K 13/007 54/82 |
| 2009/0100808 A1 * | 4/2009 | Ford | A01K 13/007 54/82 |
| 2010/0229508 A1 * | 9/2010 | Gola | A01K 13/007 54/82 |
| 2011/0000173 A1 * | 1/2011 | Lander | A01K 13/007 54/82 |
| 2011/0197554 A1 * | 8/2011 | Ruetenik | A01K 13/007 54/82 |
| 2012/0118587 A1 * | 5/2012 | Patek | A01K 13/007 168/4 |
| 2013/0019575 A1 * | 1/2013 | Bartlett | A01K 13/007 54/82 |
| 2014/0007548 A1 * | 1/2014 | Revheim | B68C 5/00 54/82 |
| 2014/0033661 A1 * | 2/2014 | Ruetenik | B29C 70/66 54/82 |
| 2014/0260126 A1 * | 9/2014 | Riley | A01L 15/00 54/82 |
| 2016/0029609 A1 * | 2/2016 | MacDonald | A01L 3/00 168/18 |
| 2016/0044907 A1 * | 2/2016 | Buchanan | A01L 3/04 168/1 |

FOREIGN PATENT DOCUMENTS

| | | | | |
|---|---|---|---|---|
| FR | 566048 A | * | 2/1924 | ............... A01L 3/00 |
| GB | 240385 A | | 10/1925 | |
| GB | 2432293 A | | 5/2007 | |
| WO | 2000016614 A1 | | 3/2000 | |
| WO | WO-2004047526 A1 | * | 6/2004 | ........... A01K 13/007 |
| WO | WO-2008132730 A2 | * | 11/2008 | ........... A01K 13/007 |
| WO | WO-2009061510 A1 | * | 5/2009 | ........... A01K 13/007 |
| WO | WO-2010123803 A2 | * | 10/2010 | ........... A01K 13/007 |
| WO | 2016055387 A1 | | 4/2016 | |

* cited by examiner

HOOF SHOE FOR A HOOFED ANIMAL

The invention relates to a hoof shoe for a hoofed animal, preferably a horse, with a bottom part and with a wall that encloses the hoof at least at the front and at the sides, which wall is provided with tightening means for fastening the hoof shoe to the hoof.

Such hoof shoes are known to serve to protect the hoof from abrasion and damage to the hoof horn, in particular on stony, rough or hard ground. In the case of illness, for example brittle horn, or injury, such hoof shoes are also used for the recovery of the hoof. Protection is provided by such a shoe in that the hoof horn is not damaged. In addition, it may be the case that the horn on the hoof is very soft and so the hoofed animal would constantly lose horseshoes.

Hoof shoes are an alternative to conventional horseshoes. In comparison to the latter they offer the advantage that they can be easily fitted and removed, for example within the framework of normal hoof care.

A hoof shoe of the type specified at the start is disclosed in EP 0 207 110 B1. The horse hoof shoe described here consists of a horseshoe-shaped bottom part, a front part matched to the horse's foot and a heel part that is continued on each side by a strip resting against the front part. At the front, attached to the front part, there is also a tensioning device consisting of a rotary knob and two loops that can be moved so as to be self-locking by turning the rotary knob. Furthermore, two tensioning straps are provided on the heel part, the one strap end hooking into one of the loops, while the other strap end is held securely on the opposite side beneath the loop located here. The tensioning straps run towards the back at the level of the tensioning device where they are guided on the rear wall of the heel part crosswise through two upper loops and two lower loops, and then to the front for fastening beneath the loops.

This design of the hoof shoe is intended to enable particularly good hold of the hoof shoe on the horse's hoof. However, the production technology is very complex and, moreover, is associated with the disadvantage that it is only possible to fit the hoof shoe and to remove it after releasing the tensioning straps and moving the cap forming the heel part. Moreover, it is a disadvantage that a defect may relatively easily occur due to its complex structure.

In contrast, the object underlying the invention is to avoid these disadvantages and to devise a hoof shoe of the type specified at the start that is easy to fit and remove, that offers a secure hold and that can be produced without a great deal of complexity.

According to the invention, this object is achieved by a hoof shoe for a hoofed animal including a bottom part having a front, a rear and sides, a wall at the front and sides of the bottom part to hereby enclose a hoof of the animal on a front and sides of the hoof when the hoof is on the bottom part, and which wall has an opening at the rear of the bottom part having a width corresponding to a width of the hoof to be shoed, at least one closure flap movable between an open position in which the opening is not closed and a closed position in which the opening is at least partially closed, and tightening means extending around the closure flaps(s) for pressing the closure flap(s) against a rear part of the hood when present on the bottom part and when the closure flap(s) is/are in the closed position.

Since the wall of the hoof shoe is open at the back with approximately the width of the hoof and is provided here with at least one closure flap that can be tensioned by the tightening means and that, in the closed state, is placed with form fit against the rear part of the hoof, it is extremely easy to position and fasten a hoof shoe on a hoof.

Very advantageously, an opening with approximately the width of the hoof is provided at the back, as is a closure flap that can be swivelled at this opening and which can be opened and closed towards the bottom about a swivel axis defined by an elongated living hinge connected to the bottom part and to the closure flap.

Therefore, the hoof shoe according to the invention consists mainly of a shoe body that can be produced easily in one or two parts, the open rear side of which makes it substantially easier to fit and remove the hoof shoe, and the rear closure flap of which, in the closed state, guarantees the secure fixing of the hoof shoe.

Within this context it is advantageous if the closure flaps are provided with half-shells matched to the hoof instep and which, in the closed state, are placed directly against it with form fit. Here these closure flaps are guided around corner edges of the hoof in order to achieve three-dimensional form fit.

Furthermore, the invention makes provision such that the side half-shells are provided with reinforcement ribs. As a result, they are stable in the height direction and can therefore ensure permanently correct fixing.

In order to press the pivotable closure flaps against the bulb of the hoof, at the front on the wall of the hoof shoe there is a cable rotary closure with which one or more tensioning cable(s) guided around the shoe can be tightened by turning the rotary closure.

For secure fixing of the hoof shoe it is advantageous here if the cable rotary closure is provided with two cables tensioned crosswise between the closure flaps, the cables preferably being guided individually within the hoof shoe so that the closing force is also effective in the upper region of the half-shells, the closure flaps are thereby closed and ensure increased hold.

In the following the invention will be described in more detail by means of an exemplary embodiment with reference to the drawings. These show as follows.

Figure 1:
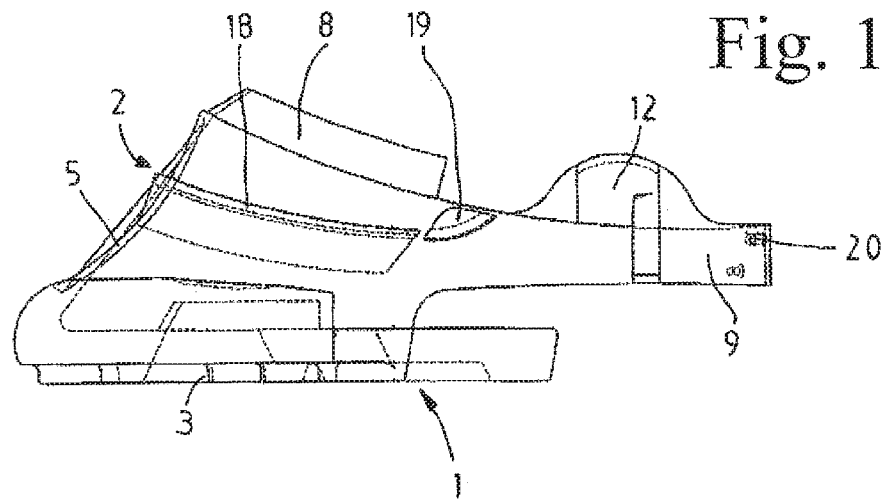
FIG. 1 is a side view of a hoof shoe according to the invention.
Figure 2:
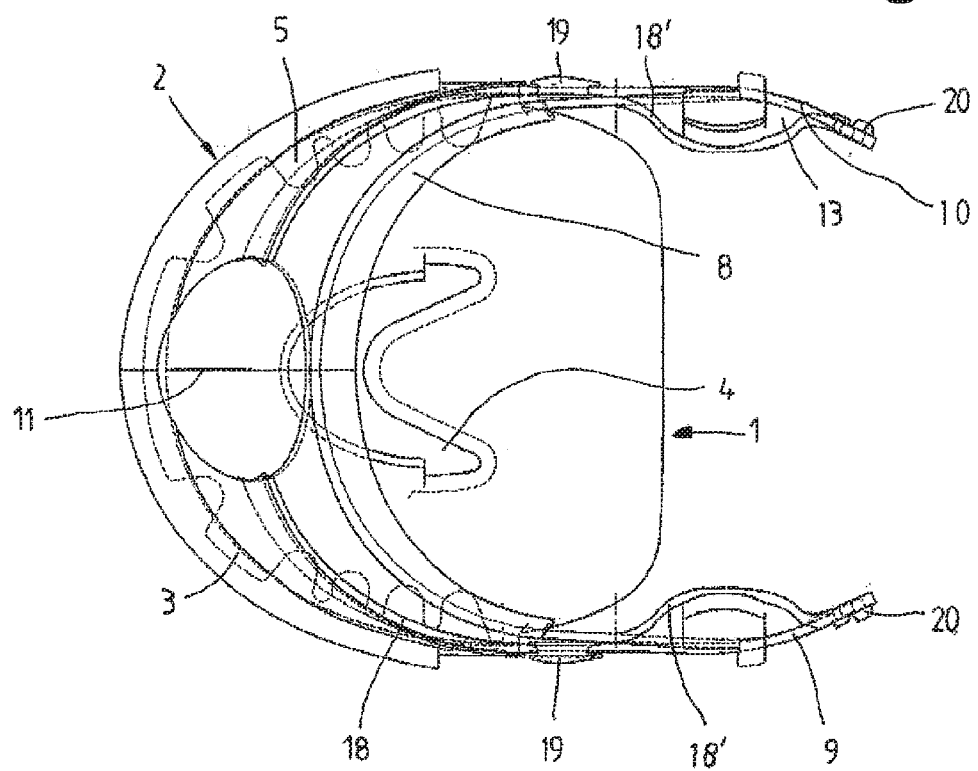
FIG. 2 is a view of the hoof shoe according to FIG. 1 from above.

The horse hoof shoe shown in FIG. 1 and FIG. 2 can be produced in one or more parts and consists essentially of a bottom part 1 and a wall 2, both plastic injection moulded, and the shaping and size of which is matched to the hoof of the respective wearer of the hoof shoe.

It is advantageous here, in a known way, to provide different shoe sizes or models depending on the breed or the size of horse. However, such hoof shoes can also be produced for other types of animal, such as mules, workhorses etc.

The bottom part 1 has a shoe profile 3, 4 made of abrasion-resistant material, for example a hard rubber, so that the shoe is subjected to a low level of wear, in particular on asphalt.

According to the invention, the wall 2 of the hoof shoe is provided at the rear on both sides with closure flaps 9, 10 that can be swivelled at the sides relative to the hoof 8. As can be seen from FIG. 2, in the open state the closure flaps 9, 10 are aligned approximately parallel to the center plane 11 of the hoof, the wall 2 of the hoof shoe being open at the rear here. The closure flaps 9, 10 additionally have flexible half-shells 12 and 13, the inner relief of which is matched to that of the hoof instep in the rear part of the hoof.

In order to fit the hoof shoe the latter is placed over the hoof after lifting the foot, the foot is then put down and finally the hoof shoe is fastened by swivelling the closure flaps 9, 10 inwards and securely clamping the shoe with appropriate tightening means. Simple handling when guiding the hoof into the shoe is thus guaranteed, and nevertheless easy clamping is made possible which serves to prevent the hoof shoe from immediately slipping off again.

As tightening means, two individually actuatable tensioning cables (not detailed) are provided which on the one hand are fitted onto the closure flaps 9, 10, and on the other hand can be tensioned by turning with a cable rotary closure 17 attached to the wall 2 at the front. The tensioning cables are guided around the half-shells 12, 13 of the closure flaps 9, 10 and the front wall 5 of the shoe such that their tensioning force around the shoe also takes effect in the region of the upper half-shells so that the latter bend in or lock in place or lie directly against the hoof instep at the edges and so fix it in place so that the hoof is secured to the top. This is particularly important if the ground is very wet and squishy and so a vacuum may be formed between the bottom part and the ground that causes large vertical forces. The result of this then is that the hoof shoe remains stuck and the hoof can slip out.

Instead of the cable rotary closure 17 pull or ratchet closures or similar tightening means with or without a translation unit can also be used. What is important is that in the closed state the hoof shoe is clamped uniformly against the hoof with the appropriate clamping force and that the half-shells 12, 13 can be placed against the rear part of the hoof with form fit here in order to fix the hoof shoe in position in the vertical direction as well.

It is also possible to use, for example, ties, straps or similar tightening means instead of cables. The half-shells 12, 13 could be provided with a cushion that protects the hoof or additional flexible tabs could be provided on the closure flaps 9, 10 which press inwards at the top on the bulb of the hoof.

In addition, the shell provides a certain amount of inwards pre-tensioning onto the hoof, the effect of which in turn is that the hoof shoe has a holding force of its own before clamping is generated by the closure. This increases user friendliness when fitting the shoe.

In order to further support uniform pre-tensioning, a spring element is advantageously assigned to the cable connection between the tabs. The shells can thus be drawn gently together until the pre-tensioning is achieved. This spring element can be, for example, a textile fabric which can be stretched resiliently by a rubber part. In addition, this fabric protects the cables from the inadvertent attachment of twigs or similar that are lying about.

As considered in the vertical direction, the constrictions provided in the wall 2 have the additional effect that the shells are optimally matched to the hoof. The attenuation or buffer undulations created in this way can, if so required, be arranged around the circumference and are arranged over the entire height of the shoe.

Figure 3:
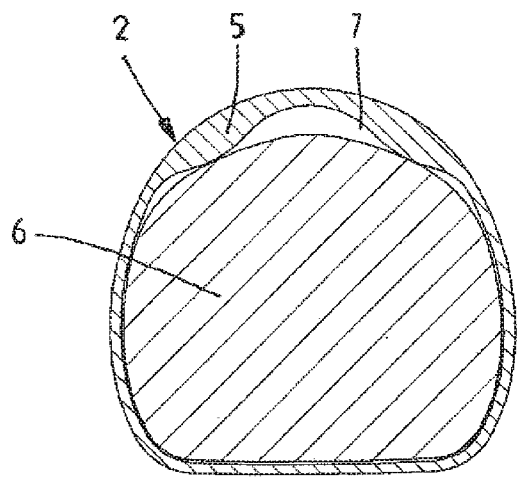
FIG. 3 is a diagrammatic section through the wall of the hoof shoe.
Figure 4:
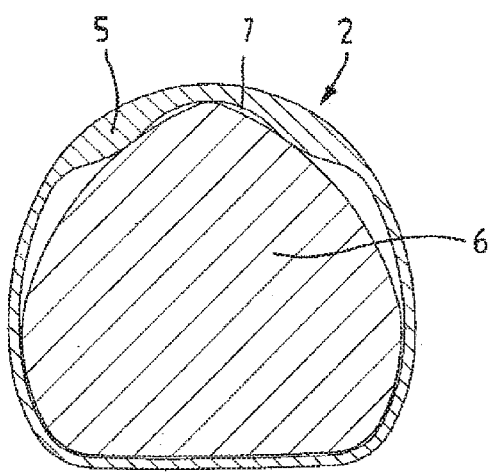
FIG. 4 is a diagrammatic section through the wall of the hoof shoe.

As can be seen from FIG. 3 and FIG. 4, the front wall 5 of the wall 2 is on its part formed such that it can be placed tightly against the horn wall of the hoof 6 at the front. For this purpose this front wall 5 has an undulating profile 7 on the inside which makes it possible for the hoof shoe to provide the best possible hold for all types and shapes of hoof, especially in the region of the possible rotation with respect to the hoof. By means of the special shaping of the front wall 5, as can be seen in FIG. 3, "extreme" forms of hoof can be catered for.

Figure 5:
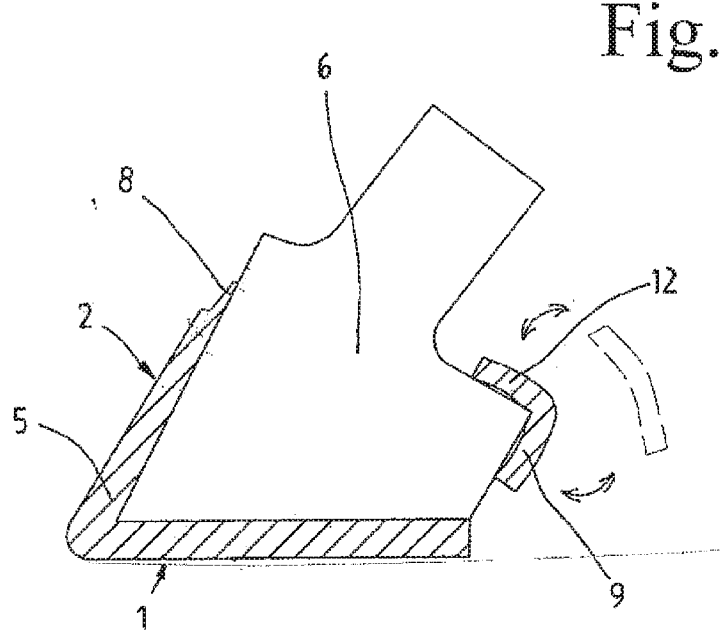
FIG. 5 is a vertical section through the wall of the hoof shoe.

According to FIG. 5, this front wall 5 of the wall 2 is equipped at the top with a flexible sealing lip 8 that can nestle against the upper edge of the hoof such as to form a seal so that no dirt passes into the hoof shoe. This sealing lip 8 is positioned at an angle such that it can accommodate the different diameters and wall inclines of a hoof. In addition, this increases the rotating adhesion of the hoof within the shoe.

Figure 6:
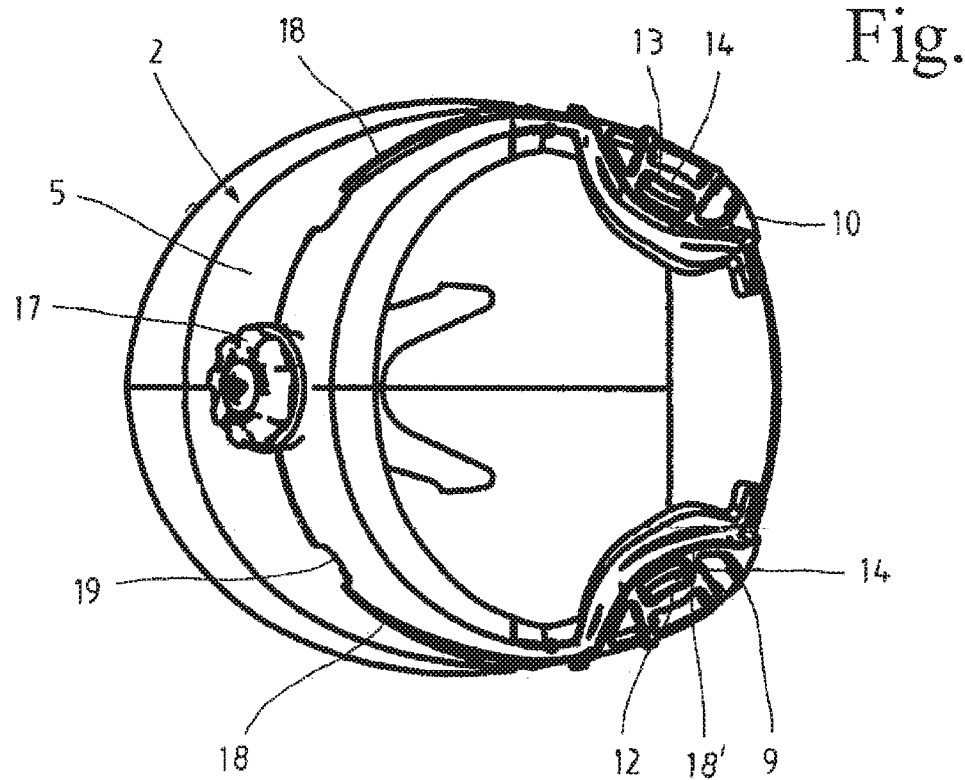
FIG. 6 is a diagrammatic top view of a version of a hoof shoe according to the invention.
Figure 7:
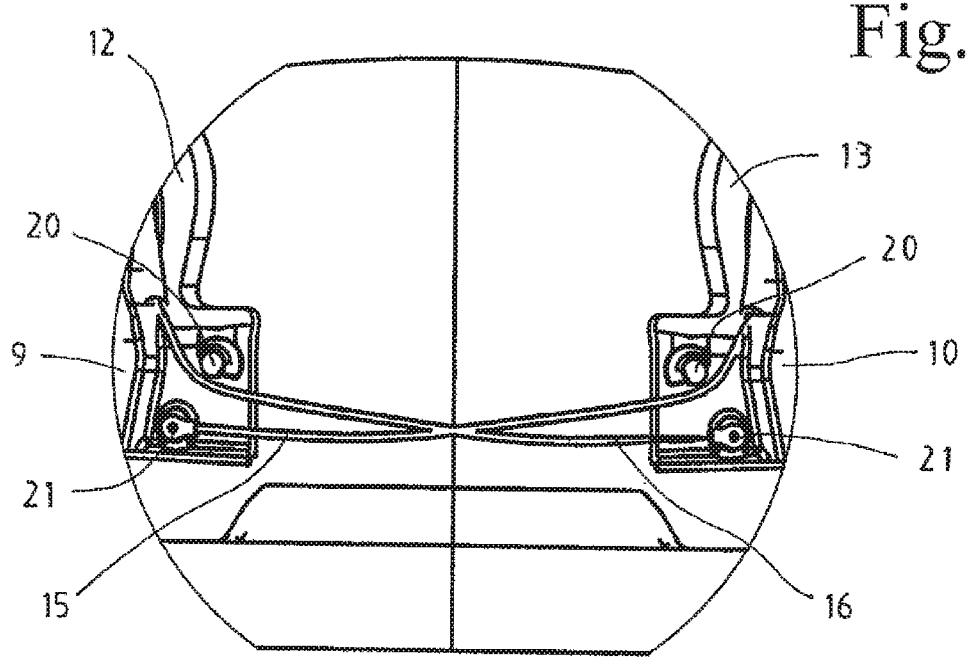
FIG. 7 is an enlarged view of the rear part of the hoof shoe according to FIG. 6.

FIG. 6 and FIG. 7 show a version of a hoof shoe similar to that of FIG. 1 and FIG. 2, and so the same reference numbers are used for the same components. In the following only the differences will be described.

On the half shells 12, 13 reinforcement ribs 14 are assigned to the closure flaps 9, 10 on the outside. The effect of these is that the half-shells remain stable at least transversely to the longitudinal extension of the shoe.

The tensioning cables 15, 16 are guided securely within guide channels 18, 18' with deflecting elements 19, 20. In the rear part of the shoe they are advantageously guided crosswise such as to tension the closure flaps 9, 10, respectively being attached with one end to a fastening part 21 on a respective closure flap.

Figure 8:
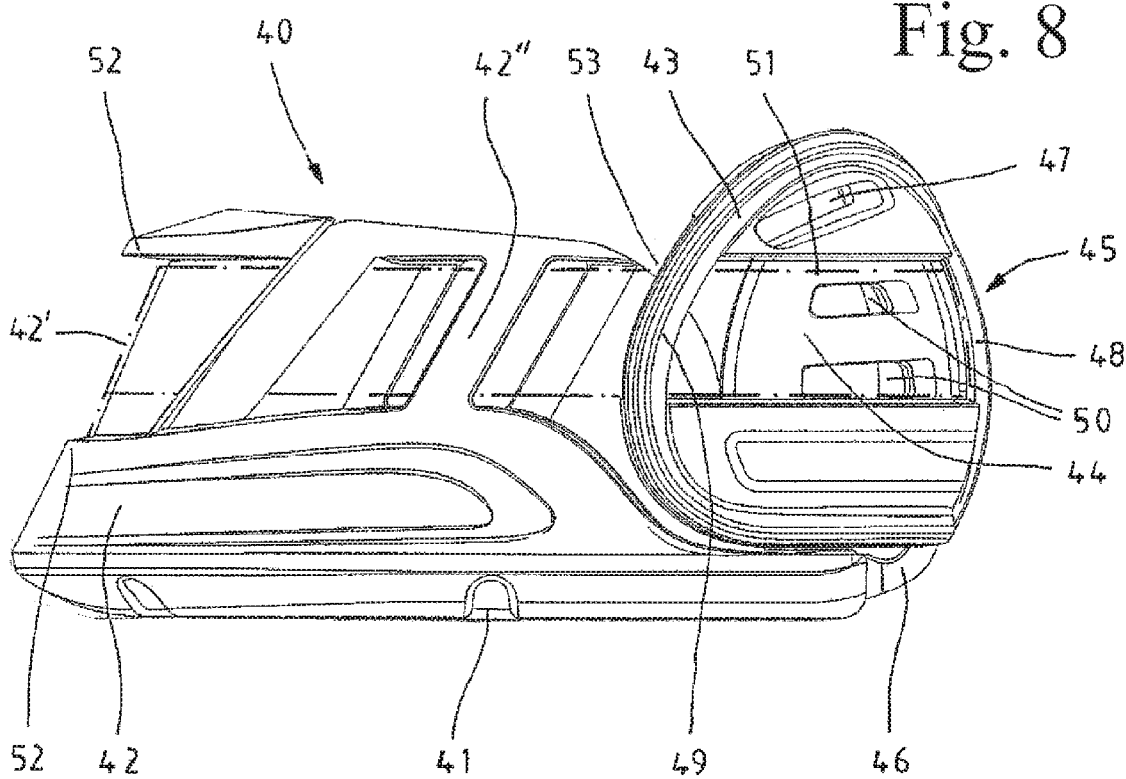
FIG. 8 is a side view of another version of a hoof shoe according to the invention with a closure flap in the closed position and FIG. 9 is a side view of the hoof shoe shown in Fig. 8 with the closure flap in the open position.
Figure 9:
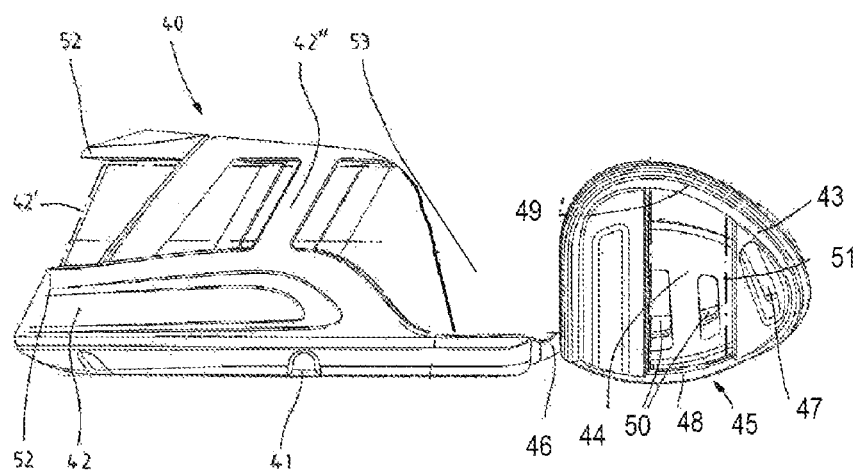

FIGS. 8 and 9 show another version of a hoof shoe 40 that can preferably be produced in one part with a sole-shaped bottom part 41 and a wall 42.

According to the invention, in this hoof shoe 40, on the rear side, an opening 53 with approximately the width of the hoof is provided and a closure flap 45 that can be swivelled at this opening 53 is provided which, in the closed state, can be pressed approximately with a form fit onto the rear part of the hoof by tightening means 51. This closure flap 45 is made in the shape of a shell and can be opened and closed towards the bottom about a horizontal swivel axis provided by an elongated living hinge 46 connected at one end region to rear edge of the bottom part 41 and to a rear portion of the closure flap 45 at an opposite end region as shown in Figs. 8 and 9. In the closed state, the closure flap 45 respectively almost adjoins the wall 42 at the side and on the outer circumference, it has a guide surface 44 and strap flaps 48, 49 spaced apart from one another, and tightening means in the form of a tie, for example, can be drawn through the latter.

Moreover, with this shell-shaped closure flap 45 cushioning shells 50, advantageously made of a soft plastic similar, for example, to ski boots, are fastened to the inside. These cushioning shells 50 extend here over almost the entire inside surface of the closure flap 45. This thus enables soft pressing of the closure flap against the rear part of the hoof and additional hold by means of this form-fit nestling.

Advantageously, on the inside of the sole-shaped bottom part 41 there is also a plate-shaped insert (not detailed) made of a special plastic with an impact-absorbing effect and which extends at least over the region with the horseshoe support.

Also assigned to the wall 42 provided at the front and at the sides, around the outside, area guide surface 42' and strap flaps 42" spaced apart from one another through which the tightening means 51 can be passed. When a shoe has been placed over a hoof, when the closure flap 45 is folded up, tensioning of the wall 42 can be brought about with the closure flap 45 on the rear side. With projections 52 at the front on the wall 42 it is ensured that the tightening means are centered and in addition, serve as contact surfaces to counter impacts.

As well as the strap flaps 48, 49 and the guide surface 44, additional angled strap apertures 47 are provided on the upper side of the closure flap 45 at the two forwardly directed ends 43, at which a second tightening means can be fastened which is provided in addition to the tightening means 51 that can be guided around the wall 42 provided with a guide surface 42' and around the closure flap 45, as indicated by dots and dashes in order to bring about even better hold of the hoof shoe 40 on the hoof. These tightening means 51 can be formed by fabric ties or the like with corresponding closures.

The hoof shoe that is described can be produced in various models and sizes and can be used for different breeds of horses or for similar hoofed animals. It is characterised by a structure that is technically simple to produce and has the substantial advantage that it can be fitted and removed without any complication, and without any special devices or aids being required for this purpose.

The invention is sufficiently demonstrated by the above exemplary embodiments. Instead of the two cables, just one cable, correspondingly deflected, can be used.

The closure flaps can have so-called deflectors in the end region as a cover and which prevent the cables from being pulled off by the rear hoof.

The invention claimed is:

1. A hoof shoe for a hoofed animal, comprising:
a bottom part having a front, a rear and sides;
a wall at the front and sides of said bottom part, said wall having an opening at the rear of said bottom part, said opening having a width corresponding to a width of the hoof to be shoed;
a single closure flap movable between an open position in which said opening is not closed and a closed position in which said opening is at least partially closed by said closure flap, the hoof being enclosed when the hoof is on said bottom part and said closure flap is in the closed position on a front, sides and a rear of the hoof by said wall and said closure flap;
tightening means for pressing said closure flap against a rear part of the hoof when on said bottom part and when said closure flap is in the closed position; and
an elongate living hinge extending rearward from a rear edge of said bottom part and having opposite ends, said elongate living hinge being attached at one of the ends to the rear edge of said bottom part and being attached at the other of the ends to a rear portion of said closure flap, said elongate living hinge enabling said closure flap to swivel between the open and closed positions.

2. The hoof shoe according to claim 1, wherein said closure flap consists of a single shell-shaped closure flap.

3. The hoof shoe according to claim 1, wherein said closure flap is alongside and outward of right and left sides of said wall when said closure flap is in the closed position.

4. The hoof shoe according to claim 3, wherein said closure flap comprises:
a guide surface, said tightening means being guided over said guide surface around said closure flap; and
two strap flaps spaced apart from one another, said tightening means passing through said strap flaps when being guided around said closure flap.

5. The hoof shoe according to claim 1, wherein said closure flap comprises:
a guide surface, said tightening means being guided over said guide surface around said closure flap; and
two strap flaps spaced apart from one another, said tightening means passing through said strap flaps when being guided around said closure flap.

6. The hoof shoe according to claim 5, wherein said wall includes:
a guide surface over which said tightening means are guided; and
spaced apart strap flaps through which said tightening means pass,
said tightening means tensioning said wall and said closure flap about the hoof when on said bottom part by passing over said guide surfaces on said closure flap and on said wall and passing through said strap flaps on said closure flap and on said wall.

7. The hoof shoe according to claim 1, wherein said bottom part, said wall and said closure flap are produced in one or more parts by plastic injection moulding.

8. The hoof shoe according to claim 1, wherein said bottom part comprises abrasion-resistant material.

9. The hoof shoe according to claim 1, wherein said wall has a front portion that has a profile on an inner surface that generates a hold depending on a cross-section of the hoof when on said bottom part.

10. The hoof shoe according to claim 1, further comprising a flat insert made of a plastic with an impact absorbing effect on an inside of said bottom part.

11. The hoof shoe according to claim 1, wherein said wall and said closure flap are connected together when said closure flap is in the closed position only by said elongate living hinge and said tightening means passing through or around said wall and said closure flap.

12. The hoof shoe according to claim 1, wherein said tightening means extend around said closure flap in its entirety.

13. The hoof shoe according to claim 1, wherein said tightening means extend around a rear of said closure flap.

14. The hoof shoe according to claim 1, wherein said closure flap includes guide structure that guides said tightening means around a rear of said closure flap such that said tightening means press said closure flap from the rear of said closure flap forward toward said wall.

15. The hoof shoe according to claim 1, wherein said closure flap is close to said wall at sides of said closure flap when said closure flap is in the closed state.

16. The hoof shoe according to claim 1, wherein said closure flap is connected along sides of said closure flap to said wall only by said tightening means when said closure flap is in the closed position.

17. The hoof shoe according to claim 1, wherein said tightening means comprise ties, straps or cables.

* * * * *